March 3, 1931. C. STEPHENS 1,794,803

AUTOMOTIVE ACCESSORY

Filed Aug. 24, 1929

Inventor
Charles Stephens,

By Clarence A O'Brien
Attorney

Patented Mar. 3, 1931

1,794,803

UNITED STATES PATENT OFFICE

CHARLES STEPHENS, OF CINCINNATI, OHIO, ASSIGNOR OF ONE-HALF TO FRANK E. BEVIER AND ONE-HALF TO AL. LEVINSON, BOTH OF HAMILTON COUNTY, OHIO

AUTOMOTIVE ACCESSORY

Application filed August 24, 1929. Serial No. 388,198.

This invention relates to a structure which may be generally broadly referred to as an automotive accessory, and it has more particular reference to an appliance, such as an anti-glare shield for use in association with a wind shield, a face mirror, rear view mirror or the like.

The improvement is predicated upon the incorporation in the structure of a novel attaching device including an especially devised hinge and a spring tensioned retaining means therefor, whereby to permit the mirror or shield, as the case may be, to be quickly placed down against the windshield in operative position, or quickly thrown up and out of the way to an out-of-the-way or ineffective position.

As seen, the specific features and advantages, and their relative association and arrangement will become more readily apparent from the following description and drawing.

In the drawings:—

Figure 1:
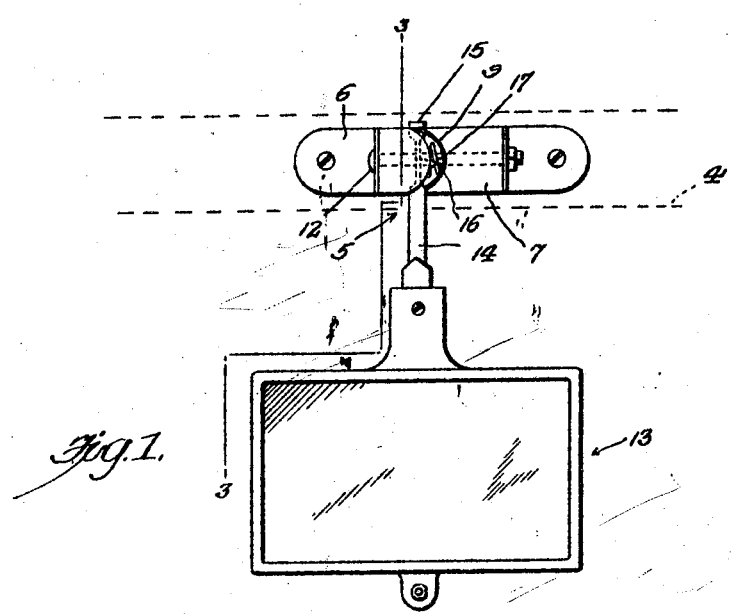
Figure 1 is an elevational view of the structure, showing the anti-glare shield down in operative position.
Figure 3:
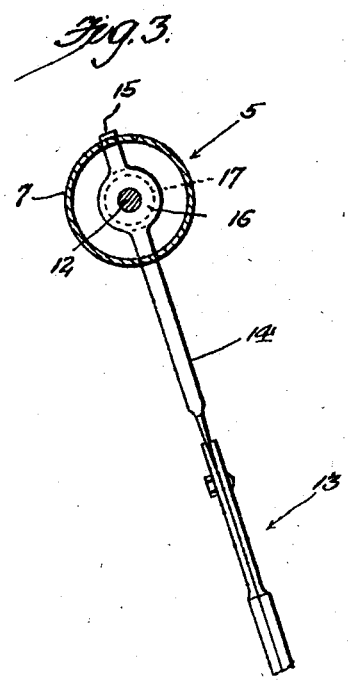
Fig. 3 is an enlarged transverse vertical section on the line 3—3 of Fig. 1.
Figure 2:
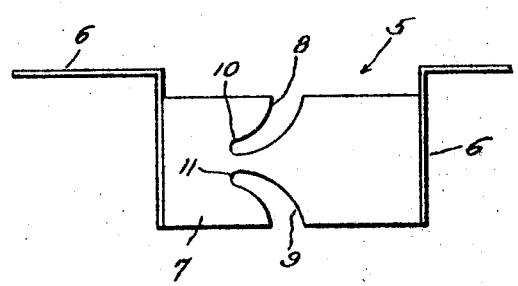
Fig. 2 is a top plan view of the attaching device.

As shown in the drawings, and in Fig. 1, the reference character 4 designates a part of a windshield on which the attaching device, generally indicated at 5, is mounted. This attaching device comprises, as seen in Fig. 2, a pair of right angle attaching brackets 6 to the opposite ends of a cylindrical casing 7. This casing is provided with arcuate guides and retention slots 8 and 9 terminating in offset keeper seats 10 and 11 respectively.

The reference character 12 designates a horizontal pivot bolt on which the adjustable appliance is mounted. The appliance herein comprises a frame 13 carrying the anti-glare shield and a stem or shaft portion 14. The shaft portion is formed with a terminal end 15, which is movable in one slot, for instance the slot 8, the portion 14 moves in the slot 9.

Then there is a disk-like abutment at 16 which is rockable and slidable on the shaft and this is confined within the casing. A coiled compression or pressure spring 17 surrounds the pivot bolt and bears against the abutment 16. Thus under the action of the sliding and pivotal movement of the shaft, it is permitted to be moved either up or down into the respective slots and to be forced into the keeper seats 10 or 11, as the case may be under the action of the springs. Thus it may be swung either up or down and out of the way or operative position, in either position, it being held against accidental displacement.

This type of hinge is particularly adaptable for use in an appliance of this class. It is such as to make it unnecessary for a more detailed description. It is thought that the foregoing description in conjunction with the drawings will give a clear understanding of the construction, method of attachment, and features of advantage, to persons familiar with the art to which the invention relates. Therefore, a more lengthy description is thought unnecessary.

Minor changes in shape, size, and rearrangement of details and materials in the field of invention claimed, may be resorted to if desired.

Having thus described my invention, what I claim as new is:—

An anti-glare device for wind-shields comprising a fixedly supported cylindrical casing comprising a pair of vertically disposed arcuate slots arranged at opposite points in the sides of the casing, a pivot rod extending centrally and longitudinally of the said casing, a shaft disposed transversely of the casing and having an integral disk like portion embracing the said pivot rod and rotatably and slidably mounted thereon, the portion of the said shaft on one side of the disk like portion being operable in one of the slots and the portion of the shaft on the opposite side of the disk like portion being operable in the other slot and extended exteriorly of the casing to provide a supporting stem, a shield supporting frame mounted on the same stem, and a tensioning spring surrounding the pivot rod and confined between the said disk like portion of the said shaft and one end of the casing.

In testimony whereof I affix my signature.

CHARLES STEPHENS.